March 24, 1953  C. J. MORTON ET AL  2,632,861
FRAME STRUCTURE FOR DYNAMOELECTRIC MACHINES
Filed Jan. 10, 1952
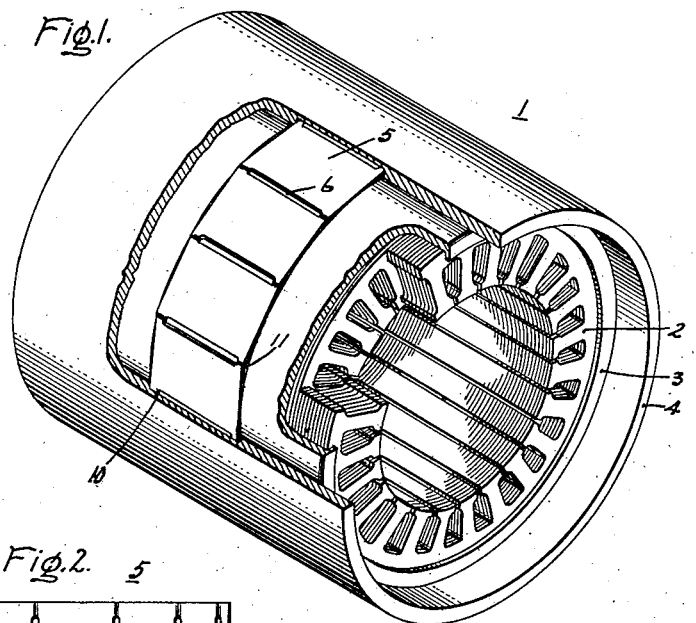
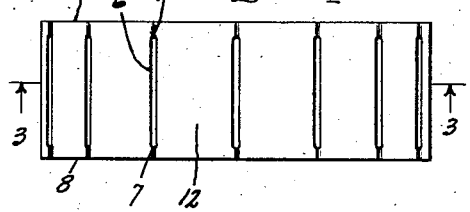
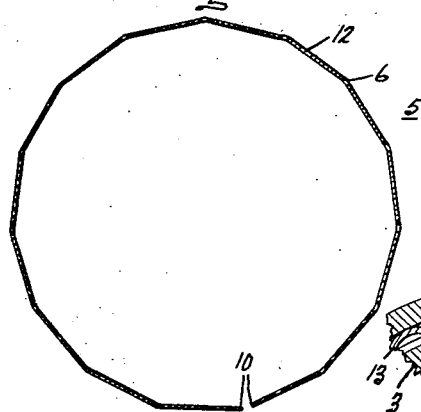
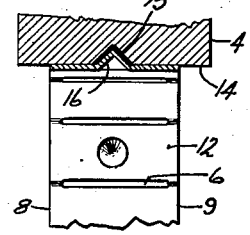
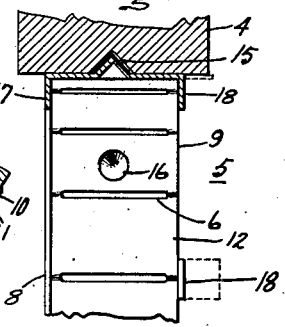
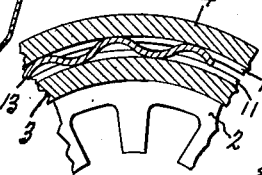
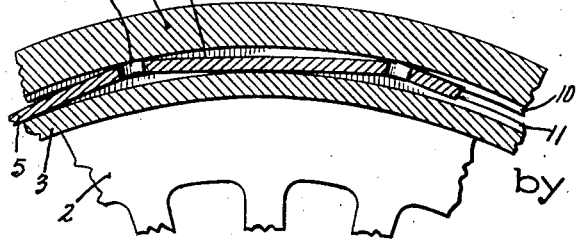
Inventors:
Cecil J. Morton,
Raymond G. Riddle,
Thomas A. Woodfield,
by *Crowell & Mack*
Their Attorney.

Patented Mar. 24, 1953

2,632,861

UNITED STATES PATENT OFFICE 2,632,861

FRAME STRUCTURE FOR DYNAMO-ELECTRIC MACHINES

Cecil J. Morton, Coventry, Raymond G. Riddle, Rugby, and Thomas H. Woodfield, Birmingham, England, assignors to General Electric Company, a corporation of New York Application January 10, 1952, Serial No. 265,864
In Great Britain March 16, 1951

7 Claims. (Cl. 310—258)

This invention relates to dynamoelectric machines and more particularly to the frame structure thereof and is specifically concerned with the mounting of dynamoelectric machine stator core members within an outer frame member.

In many dynamoelectric machines, particularly in the fractional horsepower frame sizes, the stator core member of the machine is mounted within an outer cylindrical shell or frame member. In the past, it has been necessary to press the stator core member into the outer shell, or in the alternative, to shrink the shell onto the stator core member, or to attach the stator core to the shell in some other manner, as by screws. It is desirable, however, to provide means for mounting the stator core member within the shell member which will permit the core to be readily slipped into the shell without a press fit and which will obtain accurate radial and axial location of the stator core without the necessity for securing the core to the shell by means of screw type connectors.

An object of this invention is therefore to provide an improved means for mounting a stator core member within an outer shell member.

Further objects and advantages of this invention will become apparent and the invention will be better understood by reference to the following description and the accompanying drawing, and the features of novelty that characterize this invention will be pointed out with particularity in the claims connected to and forming a part of this specification.

In accordance with the preferred embodiment of this invention, a stator core member is arranged within an outer cylindrical shell member with the outer surface of the core being cylindrical and spaced from the inner surface of the shell. A resilient packing member formed of a thin strip of spring metal and having a polygonal configuration is arranged between the outer surface of the stator core member and the inner surface of the shell member and positioned in slots respectively formed in those surfaces. The packing member, which has spaced apart ends facilitating the initial positioning of the stator core member within the shell, has a plurality of evenly spaced transverse slots formed therein defining segments therebetween, the transverse midpoints of the segments engaging the outer surface of the stator core member while the edges of the segments engage the inner surface of the shell member. This resilient packing member exerts a radial pressure between the inner stator core member and the outer shell member and the positioning of the packing member in the annular slots in the adjacent surfaces of the two members serves to prevent relative axial displacement of the members. In alternative embodiments, the packing member may have a corrugate configuration, or be provided with a plurality of spaced-apart projections on its outer surface which are positioned in an annular groove in the inner surface of the shell member to axially locate the stator core member. In a further embodiment, the resilient packing member may be provided with a plurality of spaced-apart projections or a flange on its edges to engage the ends of the stator core member to prevent axial movement of the packing member with reference to the core member.

In the drawing, Fig. 1 is a partially broken-away view in perspective showing the preferred embodiment of this invention; Fig. 2 is a top view of the resilient packing member of Fig. 1; Fig. 3 is a cross-sectional view of the resilient packing member of Fig. 2 taken along the line 3—3; Fig. 4 is a fragmentary cross-sectional view showing the arrangement of the resilient packing member between the stator core member and the shell member; Fig. 5 illustrates a modified form of the resilient packing member; Fig. 6 illustrates another modified form of the resilient packing member; and Fig. 7 illustrates a further modified form of the resilient packing member.

Referring, now, to Fig. 1, there is shown a dynamoelectric machine frame assembly 1 having a stator core member 2 formed of a plurality of relatively thin laminations of magnetic material. The stator core member 2 is shown as being in turn mounted within a cylindrical mounting member 3. The stator core member 2 and mounting member 3 are in turn arranged within an outer cylindrical shell member 4 and secured thereto by resilient packing member 5 in a manner now to be described.

The resilient packing member 5 is formed of a thin strip of suitable spring metal, such as spring phosphor bronze, which is cut to the particular length required. The packing member 5 shown in Figs. 1, 2 and 3 has a plurality of evenly spaced-apart slots 6 formed therein extending transversely across nearly the whole of the width of the member leaving only a small marginal portion 7 remaining intermediate the ends of the slots 6 and the edges 8 and 9. When the ends 10 of the strip are brought together as shown in Fig. 3, the member takes on a polygonal configuration due to the different modulus of section between the metal intermediate the slots and that at the end of the slots. In the alternative, however, the resilient packing member may be preformed into a polygonal-shaped configuration prior to insertion between the stator core member and the shell member, thus eliminating the transverse slots 6.

In order to prevent relative axial displacement of the stator core member 2 and mounting member 3 assembly, and the outer shell member 4, the inner surface of the outer shell member 4 has an annular slot 10 formed therein and the outer surface of the mounting member 3 has a corresponding annular slot 11 formed therein, these slots being of uniform depth and of a width sufficient to accommodate the resilient packing member 5. The resilient packing member 5 is inserted intermediate the outer shell member 4 and the mounting member 3 so as to be located within the grooves 10 and 11 and it will be seen by inspection of Fig. 4 that the segments 12 defined by the slots 6, which form the flat portions of the polygon, each has a flat plane which is substantially chordal to the cylindrical inner surface of the outer shell member and substantially tangential to the cylindrical peripheral surface of the inner mounting member 3. Thus, the transverse mid-portions of the segments 12 engage the outer surface of the member 3 and the edges of the segments 12 formed by the slots 6 engage the inner surface of the sleeve member 4. When the resilient packing member 5 is so located, it is distorted slightly from its polygonal shape, as shown in Fig. 4, so that considerable radial pressure is exerted between the sleeve member 4 and the mounting member 3. It will also be seen that the edges 8 and 9 of the packing member 5 respectively engage the edges of the slots 10 and 11 so as to prevent axial displacement of the stator core member 2 and mounting member 3 with respect to the outer shell member 4.

It will be readily seen that the resilient packing member need not be of polygonal configuration, as shown in Fig. 3, but may be of corrugate form, as shown in Fig. 7 in which corrugated packing member 13 is arranged between the outer shell member 4 and the inner mounting member 3 in the grooves 10 and 11. It will be here seen that by virtue of the irregular configuration of the packing member 13, certain portions engage the outer surface of the mounting member 3 and other portions engage the inner surface of the shell member 4 so as to exert radial pressure between the two members, the grooves 10 and 11 again serving to prevent axial displacement of the resilient packing member with respect to the outer shell member 4 and the inner mounting member 3.

Referring now to Fig. 5 in which an alternative method of preventing relative axial displacement of the members is shown, the inner surface 14 of the shell member 4 has an annular groove 15 formed therein and the outer surface of the resilient packing member 5 has a plurality of evenly spaced conical projections 16 formed thereon which are positioned in the annular groove 15. Relative axial displacement of the resilient packing member 5 with the inner mounting member 3 may be prevented by providing the inner member with the annular groove 11, as described above.

In a further alternative method of preventing relative axial displacement of the outer shell member 4 and the inner mounting member 3, as shown in Fig. 6, the resilient packing member 5 is again provided with the conical projections 16 which engage the groove 15 and the inner surface of the shell member 4 and is further provided with either flange portions as shown at 17 for spaced-apart projections or ears 18 on the edges 8 and 9 thereof to engage the axial ends of the mounting member 3.

It will now be readily apparent that this invention provides an improved means of mounting the stator core member of a dynamoelectric machine within the outer shell member wherein the stator core member is accurately located, both radially and axially, without the necessity for a press fit within the shell. To assemble the structure of this invention, the resilient packing member is assembled on the stator core member in the groove 11 and its ends compressed so that they are together and the assembly then slid into the shell member 4. When the stator core member reaches the point where the resilient packing member meets with the annular groove 10 in the shell member 4 or the projections 16 meet with the annular groove 15 in the shell member, the packing member will expand positioning the stator core member axially by means of the axial positioning arrangements described above and radially by virtue of the pressure exerted between the outer shell member and the stator core member.

While we have illustrated and described a particular embodiment of this invention, further modifications and improvements will occur to those skilled in the art. We desire it to be understood, therefore, that this invention is not limited to the forms shown and we intend, in the appended claims, to cover all modifications which do not depart from the spirit and scope of this invention.

What we claim as new and desire to secure by Letters Patent of the United States is:

1. In a dynamoelectric machine, an outer cylindrical shell member having an annular slot formed in its inner surface, an inner stator core member arranged within said shell member and having a cylindrical outer surface spaced from the inner surface of said shell member with an annular slot formed therein, and an annular resilient packing member formed of a thin strip of spring metal with spaced-apart ends having a substantially polygonal configuration and being arranged between the inner surface of said shell member and the outer surface of said stator core member with portions engaging said outer surface of said stator core member and other portions engaging said inner surface of said shell member, said packing member being arranged in said annular slots in said stator core member and said shell member whereby said stator core member is axially and radially located within said shell member.

2. In a dynamoelectric machine, an outer cylindrical shell member, an inner stator core member arranged within said shell member and having a cylindrical outer surface spaced from the inner surface of said shell member, and an annular resilient packing member formed of a thin strip of spring metal with spaced-apart ends having a substantially polygonal configuration arranged between the inner surface of said shell member and the outer surface of said stator core member whereby said stator core member is axially and radially located within said shell member, said packing member having a plurality of evenly spaced transverse slots formed therein defining substantially flat segments therebetween, the transverse center portions of said segments respectively engaging said outer surface of said stator core member and the edges of said segments engaging said inner surface of said shell member.

3. In a dynamoelectric machine, an outer cylindrical shell member having an annular slot formed in its inner surface, an inner stator core member arranged within said shell member and having a cylindrical outer surface spaced from the inner surface of said shell member with an annular slot formed therein, and an annular resilient packing member formed of a thin strip of spring metal with spaced-apart ends having a substantially polygonal configuration and being arranged between the inner surface of said shell member and the outer surface of said stator core member, said packing member being arranged in said annular slots in said stator core member and said shell member whereby said stator core member is axially and radially located within said shell member, said packing member having a plurality of evenly spaced transverse slots formed therein defining substantially flat segments therebetween, the transverse center portions of said segments respectively engaging said outer surface of said stator core member and the edges of said segments engaging said inner surface of said shell member.

4. In a dynamoelectric machine, an outer cylindrical shell member having an annular groove formed in its inner surface, an inner stator core member arranged within said shell member and having a cylindrical outer surface spaced from the inner surface of said shell member, and an annular resilient packing member formed of a thin strip of spring metal with spaced-apart ends having a substantially polygonal configuration with a plurality of spaced-apart projections formed on its outer surface and being arranged between the inner surface of said shell member and the outer surface of said stator core member with portions engaging said outer surface of said stator core member and other portions engaging said inner surface of said shell member, said projections on said packing member being arranged in said annular groove in said shell member whereby said stator core member is axially and radially located within said shell member.

5. In a dynamoelectric machine, an outer cylindrical shell member, an inner stator core member arranged within said shell member and having a cylindrical outer surface spaced from the inner surface of said shell member, and an annular resilient packing member formed of a thin strip of spring metal with spaced-apart ends having a substantially polygonal configuration arranged between the inner surface of said shell member and the outer surface of said stator core member with portions engaging said outer surface of said stator core member and other portions engaging said inner surface of said shell member whereby said stator core member is axially and radially located within said shell member, said packing member having means formed on its edges for engaging the ends of said stator core member.

6. In a dynamoelectric machine, an outer cylindrical shell member having an annular groove formed in its inner surface, an inner stator core member arranged within said shell member and having a cylindrical outer surface spaced from the inner surface of said shell member, and an annular resilient packing member formed of a thin strip of spring metal with spaced-apart ends having a substantially polygonal configuration with a plurality of spaced-apart projections formed on its outer surface and being arranged between the inner surface of said shell member and the outer surface of said stator core member with portions engaging said outer surface of said stator core member and other portions engaging the inner surface of said shell member whereby said stator core member is axially and radially located within said shell member, said projections on said packing member being arranged in said annular groove in said shell member, said packing member having means formed on the edges thereof engaging the ends of said stator core member.

7. In a dynamoelectric machine, an outer cylindrical shell member, an inner stator core member arranged within said shell member and having a cylindrical outer surface spaced from the inner surface of said shell member, and an annular resilient packing member formed of a thin strip of spring metal with spaced-apart ends having a substantially polygonal configuration arranged between the inner surface of said shell member and the outer surface of said stator core member whereby said stator core member is axially and radially located within said shell member, said packing member having a plurality of evenly spaced transverse slots formed therein defining substantially flat segments therebetween, the transverse center portions of said segments respectively engaging said outer surface of said stator core member and the edges of said segments engaging said inner surface of said shell member, said packing member having means formed on its edges engaging the ends of said stator core member.

CECIL J. MORTON.
RAYMOND G. RIDDLE.
THOMAS H. WOODFIELD.

REFERENCES CITED

The following references are of record in the file of this patent:

UNITED STATES PATENTS

| Number | Name | Date |
|---|---|---|
| 1,602,947 | Schroeder | Oct. 12, 1926 |
| 1,688,891 | Spreen | Oct. 23, 1928 |
| 1,980,026 | Wood | Nov. 6, 1934 |
| 2,112,747 | Wood | Mar. 29, 1938 |
| 2,295,203 | Darnell | Sept. 8, 1942 |
| 2,513,227 | Wylie | June 27, 1950 |

FOREIGN PATENTS

| Number | Country | Date |
|---|---|---|
| 620,889 | Great Britain | Mar. 31, 1949 |